United States Patent
Saito et al.

(10) Patent No.: US 9,626,823 B2
(45) Date of Patent: Apr. 18, 2017

(54) SYSTEM AND METHOD OF PREDICTING FUTURE DEMAND OF A CHARGING STATION

(71) Applicant: Nissan North America, Inc., Franklin, TN (US)

(72) Inventors: Daisuke Saito, Sunnyvale, CA (US); Toshiro Muramatsu, Sunnyvale, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 349 days.

(21) Appl. No.: 14/250,951

(22) Filed: Apr. 11, 2014

(65) Prior Publication Data
US 2015/0294228 A1    Oct. 15, 2015

(51) Int. Cl.
*G06F 17/00* (2006.01)
*G07F 15/00* (2006.01)
*G06Q 10/04* (2012.01)
*G06Q 50/06* (2012.01)

(52) U.S. Cl.
CPC ........... *G07F 15/005* (2013.01); *G06Q 10/04* (2013.01); *G06Q 50/06* (2013.01); *Y02T 90/12* (2013.01); *Y02T 90/128* (2013.01)

(58) Field of Classification Search
None
See application file for complete search history.

(56) References Cited

U.S. PATENT DOCUMENTS

| 8,301,323 | B2 | 10/2012 | Niwa | |
| 2011/0106329 | A1 | 5/2011 | Donnelly et al. | |
| 2011/0193522 | A1* | 8/2011 | Uesugi | B60L 1/003 320/109 |
| 2013/0096751 | A1 | 4/2013 | Riley et al. | |
| 2015/0298565 | A1* | 10/2015 | Iwamura | B60L 11/1844 701/22 |

OTHER PUBLICATIONS

Tolosana-Calasanz et al. "A Distributed In-Transit Processing Infrastructure for Forecasting Electric Vehicle Charging Demand", IEEE/ACM Symposium CCGC, 2013, pp. 538-545.*

* cited by examiner

*Primary Examiner* — Li-Wu Chang
(74) *Attorney, Agent, or Firm* — Global IP Counselors, LLP

(57) ABSTRACT

A system and method of predicting future demand of a charging station include collecting probe data from a plurality of electric vehicles. The probe data includes charging activity history of the plurality of electric vehicles. A usage pattern of a charging station is determined based on the probe data for the charging station. A future demand for the charging station is predicted by applying the usage pattern to a factor associated with a requesting electric vehicle. The predicted future demand for the charging station is provided to the requesting electric vehicle.

26 Claims, 5 Drawing Sheets

SYSTEM AND METHOD OF PREDICTING FUTURE DEMAND OF A CHARGING STATION

BACKGROUND

Field of the Invention

The present invention generally relates to charging of an electric vehicle. More specifically, the present invention relates to a system and method of predicting future demand of a charging station.

Background Information

An electric vehicle (EV) stores electricity received from an external power source. The stored electricity powers the EV. The range of the EV is limited by the amount of stored electricity. The range of an EV is typically less than the range of a traditional internal combustion engine (ICE) vehicle. Additionally, there are fewer charging stations for EVs than gas stations for ICE vehicles. Due to having fewer charging options, a problem exists for EV users regarding whether a charging station is available for charging when needed.

Some services are provided to EV users to facilitate charging the EV. A global positioning system (GPS) can provide a geographical location of a charging station. Locations can be provided for the charging station nearest the current location of the EV. Additionally, locations of charging stations along a planned route can be provided. Availability information, such as the business hours of the charging station and the number of charging spots provided at the charging station, can also be provided with the geographical location of the charging station to further facilitate charging by the EV user. Still further, real-time vacancy information can be provided to the EV user as to the current availability of a charging spot at a charging station.

However, a problem with providing real-time vacancy information to the EV user is that by the time the EV user arrives at the charging location, the charging spot indicated as being available could be in use by another EV. Public chargers take approximately thirty (30) minutes to fast or quick charge the EV to approximately 100%. As shown in FIG. 1, several EVs can arrive at a public charger 1 to charge their EVs at approximately the same time. A first EV 2 to reach the charger 1 has no waiting time to begin charging their EV. A second EV 3 has at least a 30 minute wait before the charger 1 is available. A third EV 4 has at least a 60 minute wait before the charger 1 is available. Given the limited number of charging stations, the EVs in line can either wait to charge their EV or attempt to find an available charger at another charging station. Both options can result in time spent by the EV user merely waiting for an available charger, which is inefficient and an unproductive use of the user's time. Accordingly, a problem exists in that although a charging location was indicated as having an available charger, by the time the EV arrives the charger is in use by another EV.

SUMMARY

It has been discovered that to avoid waiting to charge an EV at a charging location, information regarding a likelihood of availability of a charging station is provided to a requesting EV. The likelihood of availability is provided as a predicted future demand associated with a particular charging station based on a history of charging activity at that charging station.

In view of the state of the known technology, one aspect of the present invention is a method of predicting future demand of a charging station. Probe data is collected from a plurality of electric vehicles. The probe data includes charging activity history of the plurality of electric vehicles. A usage pattern of a charging station is determined based on the probe data for the charging station. A future demand for the charging station is predicted by applying the usage pattern to a factor associated with a requesting electric vehicle. The predicted future demand for the charging station is provided to the requesting electric vehicle.

Another aspect of the present invention provides a system of predicting future demand of a charging station. A data center includes a data collector configured to collect probe data from a plurality of electric vehicles. The probe data includes charging activity history of the plurality of electric vehicles. A determination unit of the data center is configured to determine a usage pattern of a charging station based on the probe data for the charging station and to predict a future demand for the charging station by applying the usage pattern to a requesting electric vehicle. A transmitting unit of the data center is configured to transmit the predicted future demand. A requesting electric vehicle includes a communication unit configured to receive the predicted future demand for the charging station from the transmitting unit. A display of the requesting electric vehicle is configured to display the predicted future demand.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
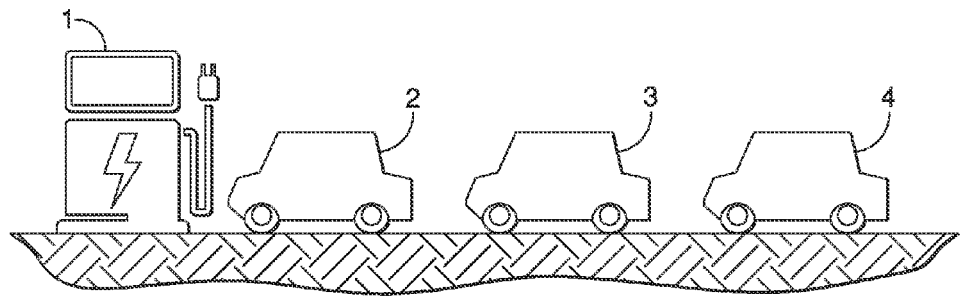
FIG. 1 is a schematic diagram of a plurality of electric vehicles waiting to charge at a charging station.
Figure 2:
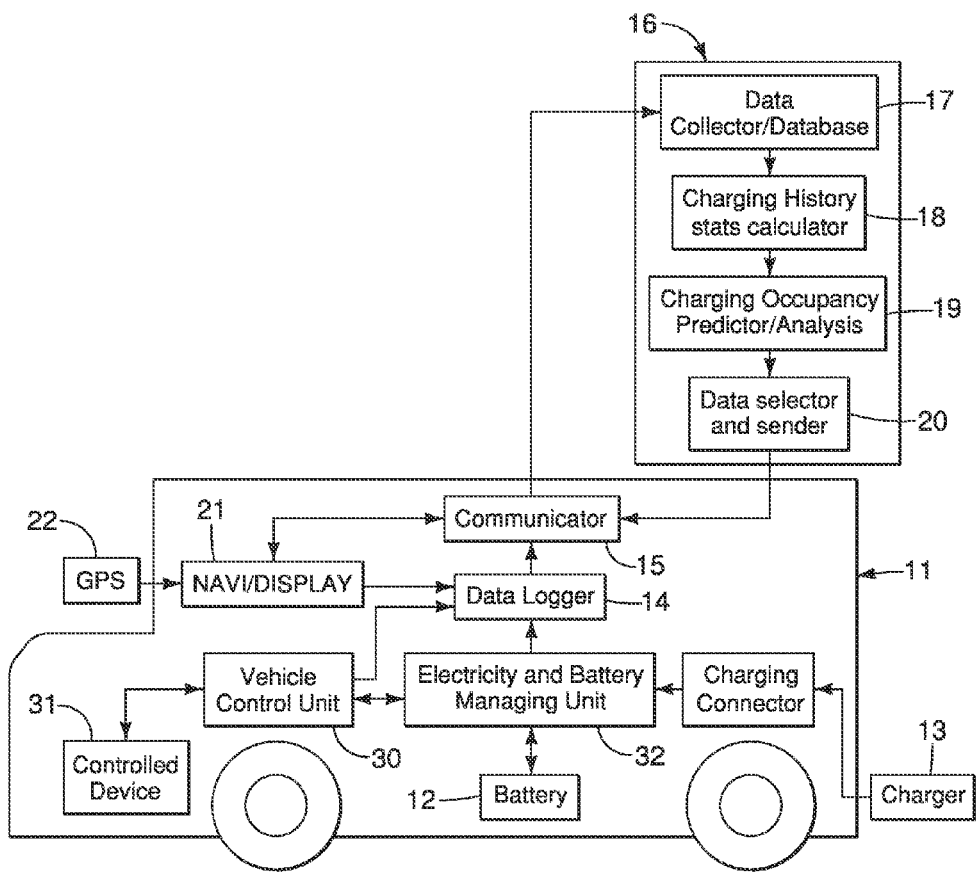
FIG. 2 is a schematic diagram of a plurality of charging stations associated with a programmed trip of an electric vehicle.

As shown in FIG. 2, an electric vehicle 11 in accordance with an exemplary embodiment of the present invention includes a battery 12 to store electricity received from a charger 13. Several types of chargers are available for charging the battery 12. A level I charger, such as a conventional 110V outlet available at a residence, can be used to charge the battery and requires a charge time of approximately eighteen (18) hours. A level II charger requires special equipment and provides a 240V connection. Level II chargers can be provided at any location, but still require a lengthy charge time of approximately eight (8) hours. Level III chargers also require special equipment and are primarily provided by municipalities and businesses. A level III charger can charge an EV battery 12 to approximately 80% in approximately fifteen (15) minutes and to approximately 100% in approximately thirty (30) minutes. The exemplary embodiments of the present invention are directed to a system and method of predicting availability of a public charger at a public charging station, such as a level III charger at an EV charging station.

The EV 11 has a data logger 14 configured to store data associated with a charging event. The stored data regarding the EV's usage history data is probe data. The probe data includes, but is not limited to, location of the charging station, an arrival time at the charging station, a start time for the start of charging, and an end time for the end of charging. Situational identifiers can also be stored by the data logger. The situational identifiers can include, but are not limited to, a power on time for when the EV is powered on, a running time for the length of time the EV is being driven while powered on, a power off time for when the EV is powered off, and a route path indicating the route the EV has taken. Additionally, the data logger 14 can store the state of charge (SOC), i.e., the remaining battery life, associated with any of the other stored data. For example, the remaining battery life can be stored with the time associated with powering on the EV.

The data logger 14 is connected to a navigation and display unit 21, as shown in FIG. 2, such that the data logger 14 can obtain and store information related to a destination, a travel route to reach the destination and a current location on the travel route. A vehicle control unit 30 is connected to a controlled device 31, such as a motor, air conditioning or a brake, to control operation of the device. The data logger 14 is also connected to the vehicle control unit 30 to obtain and store information related to the vehicle control unit 30, such as powering on and off of the motor. An electricity and battery managing unit 32 is connected to the battery 12 to manage operation of the battery 12. The data logger 14 is connected to the electricity and battery managing unit 32 to obtain and store information related to the battery 12, such as the time charging of the battery starts and stops and the current state of charge of the battery. The EV 11 has a communicator or communication unit 15 configured to communicate with a data center 16, as shown in FIG. 2. The data logger 14 provides the probe data to the communication unit 15, which transmits the probe data to the data center 16, as shown in FIGS. 2 and 3.

Figure 3:
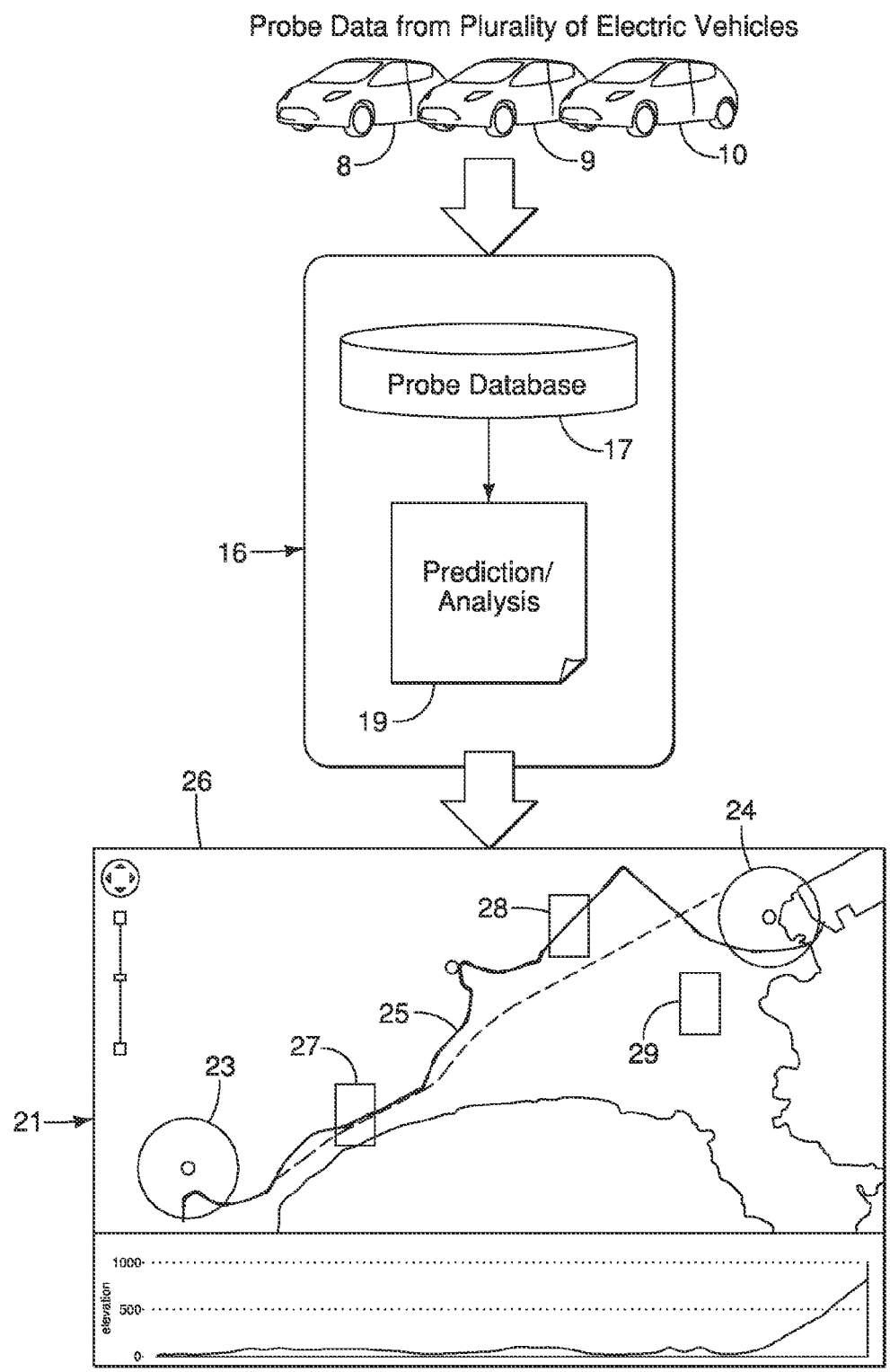
FIG. 3 is a schematic diagram of a method of providing a usage value for a charging station to a requesting electric vehicle in accordance with an exemplary embodiment of the present invention.

The data center 16 includes a data collector or data collection unit 17 configured to receive probe data from a plurality of EVs 8, 9 and 10, as shown in FIG. 3. The probe data received by the data center 16 can include probe data from the requesting EV 11 when the requesting EV 11 has probe data relevant to the particular charging station. A single data center 16 can be used to receive the probe data from the EVs 8, 9 and 10. Alternatively, a plurality of data centers 16 can be used such that each data center covers a predetermined area or region.

A charging history statistics calculation unit or calculator 18 receives the probe data and compiles relevant statistics regarding usage history of a charging station, as shown in FIG. 2. A charging occupancy predictor/analysis or determination unit 19 receives the charging station statistics from the calculation unit 18 and based on the received statistics predicts future usage for the charging station. The data selector and sender or transmitting unit 20 is configured to transmit the predicted future usage of the charging station to the requesting electric vehicle 11. The predicted future usage can be based on particular data selected by the requesting vehicle 11, such as, but not limited to, the day of the week, the time of day, the charging station location or the EV location.

The transmitting unit 20 transmits a usage value associated with the particular charging station to the communication unit 15 of the requesting electric vehicle, as shown in FIG. 2. The received usage value is then displayed on a display 26 of a navigation and display unit 21 of the requesting EV 11, as shown in FIG. 3.

Figure 4:
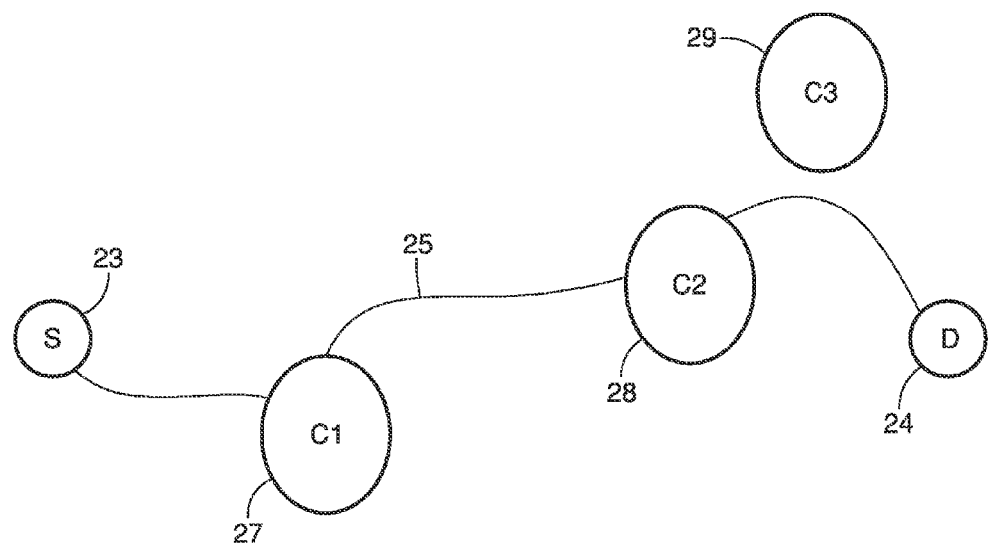
FIG. 4 is a schematic diagram of communication between an electric vehicle and a data center in accordance with an exemplary embodiment of the present invention.

The navigation/display unit 21 of the EV 11 is configured to communicate with a global positioning system 22, as shown in FIG. 2. When programming a route to be traveled, the user inputs a start point 23 and a destination 24, as shown in FIGS. 3 and 4. A route 25 to be followed is calculated based on input parameters to travel from the start point 23 to the destination 24.

Information relating to the status of a charging station, such as whether the charging station is in use or has an available charger, is valuable to plan the route to be followed to reach the desired destination 24. The availability of a charging station along a route is unlikely to be the same by the time the EV reaches the charging station. This can be problematic, particularly when on a longer route in which charging the EV might be required.

The probe data collected by the data center 16 from a plurality of EVs 8, 9 and 10 provides information such that the current and predicted usage condition of the charging station can be determined, as shown in FIGS. 3 and 4. The usage condition can be provided for a particular charging station of interest or for a plurality of charging stations. For example, the usage condition can be provided for charging stations 27 and 28 on the route 25 to be followed or a charging station 29 near the route being followed. In an exemplary embodiment of the present invention, the charging stations 27, 28 and 29 are provided with a visual indication, such as a color, indicating the likelihood of availability of the charging station at the time the EV 11 reaches the charging station. Accordingly, such information can be used by the EV user to plan the route 25 that provides the best possibility of availability of a charging station on or near the route.

Figure 5:
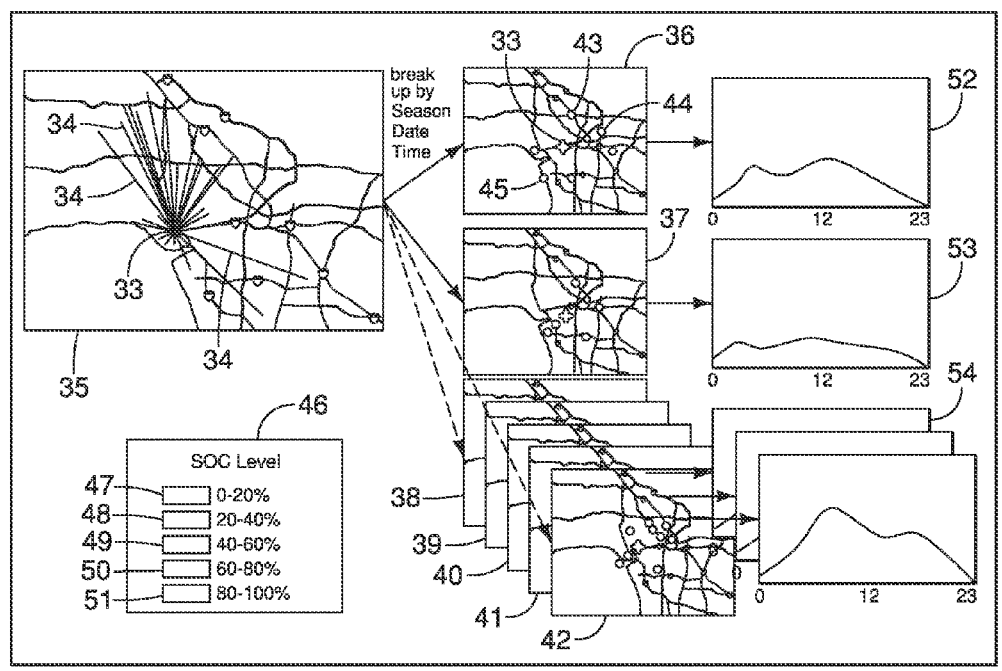
FIG. 5 is a schematic diagram of electrical vehicle probe data received and statistics determined thereby for display by a requesting electric vehicle.

As shown in FIGS. 3 and 5, the usage value associated with a charging station can be an indication of congestion at the charging station. Any suitable indications of congestion can be used. For example, the indications can be "vacant" to indicate no waiting time, "rarely occupied" to indicate under approximately 10% vacant, "slightly congested" to indicate under approximately 30% vacant, "relatively crowded" to indicate between approximately 30 to approximately 60% vacant, and "crowded" to indicate over approximately 60% crowded. The charging stations 27, 28 and 29 on the display 26 of the requesting EV can be tagged with these descriptors to indicate the predicted congestion at a particular charging station. Alternatively, the charging stations shown on the display 26 of the EV can be color coded to indicate the predicted congestion of the charging station. For example, a "vacant" charging station can be shown as green, a "rarely occupied" charging station can be shown as blue, a "slightly congested" charging station can be shown as purple, a "relatively crowded" charging station can be shown as yellow, and a "crowded" charging station can be shown as red. The indication of congestion can be broken down into any suitable number of categories and indicated in any suitable manner readily understandable by the user of the EV 11.

When plotting the travel route 25, the usage values of the charging stations 27, 28 and 29 on and near the route 25 can be shown with an associated indication of congestion. Accordingly, the user of the EV can select a desired route most advantageous with regard to the probability of accessing an available charger at a charging station.

The probe data received from at least one EV is used to analyze and predict the charging demand for each charging station. The predicted charging demand is provided to EV users as a usage value for each charging station. The usage value can be represented, as described above, as an indication of congestion of the charging station. The provided usage value provides load balancing for charging station usage, thereby allowing EV users to select charging stations having a higher probability of availability to more evenly distribute usage of the existing charging stations. The navigation and display unit 21 can generate a travel route 25 to a most reasonable charging station based on the predicted congestion of the charging station and the remaining battery charge of the EV.

The determination of the usage value associated with a charging station 33 is illustrated in FIG. 5. The routes 34 traveled by every EV that arrived at that particular charging station 33 is illustrated on a map 35. The charging history or probe data for each of these EVs arriving at the charging station 33 is received by the data center 16 (FIG. 2). The data center 16 can then break down the probe data by any suitable factor, as illustrated in maps 36-42. For example, manipulating the probe data by season is graphically illustrated by map 36. The EVs 43-45 that arrived at the charging station 33 can be color coded to indicate their state of charge (SOC) when arriving at the charging station. As illustrated in the legend 46, the EV is shown red 47 to indicate an SOC of approximately 0-20%, yellow 48 to indicate an SOC of approximately 20-40%, green 49 to indicate an SOC of approximately 40-60%, teal 50 to indicate an SOC of approximately 60-80% and blue 51 to indicate an SOC of approximately 80-100%. The probe data can also be manipulated by a particular day of the week as shown in map 37, by a particular time of the day in map 38, and so forth. Accordingly, the probe data can be manipulated by any desirable factor for which a predicted usage of the charging station based on that factor is desired. From each of the probe breakdown maps 36-42, the data center 16 then obtains statistics associated with that particular factor. Any desirable statistic can be determined from the probe data, such as, but not limited to, an occupancy trend, queuing volume and waiting time. For example, a statistical graph 52 regarding occupancy trends through the seasons can be determined from the seasonal probe data illustrated in map 36. A statistical graph 53 regarding queuing volume for a particular day of the week can be determined from the day of the week probe data illustrated by map 37. A statistical graph 54 regarding waiting time for a particular time of the day can be determined from the time of the day probe data illustrated by map 38. The data center 16 then transmits the desired usage value for a desired charging station to the requesting EV 11, as shown in FIGS. 2 and 3.

Using the history data of EVs, the charging station's occupancy situation can be predicted or forecast. Statistics for each charging station's usage history can be made, such as illustrated in maps 52-54 of FIG. 5. The statistics can be based on the charging history of the EVs 43, 44 and 45 and occupancy patterns can then be determined therefrom. Waiting time and queuing volumes can be determined for the charging station, which can be for a specific charger at that charging station of for several chargers located at that charging station. The pattern can also be based on time, such as a specific hour or a time period, such as morning, noon, afternoon, night or midnight. The pattern can be based on a particular day of the week, such as a weekday or the weekend. The pattern can be based on a particular date or a season, such as summer. A similar pattern is determined for a particular charger, date and time (e.g., charging station X from 10 am-12 pm) and the pattern is sent to the requesting electric vehicle as forecasting information.

The current locations of the EVs can be included with the probe data such that a relationship can be determined between the location distribution of the EVs and the usage patterns of the charging stations. A trend model for each pattern characteristic can be made. The most similar EV distribution situation can be determined for a particular period (e.g., the present) and the corresponding occupancy trend can be provided to the requesting EV as forecasting information.

The departure and arriving locations of the EVs, as shown in map 35 of FIG. 5, can be included with the probe data. Relationships can be determined between the occupancy pattern of the charging station and the distribution of the EVs, particularly using the departure point of a route for each EV that arrived at and eventually used the charging station. The most similar pattern for departing EVs at a specific time, e.g., the present, can be determined and the corresponding occupancy trend can be provided as forecasting information to the requesting EV.

The trajectory or travel route of each EV can be included with the probe data, as shown in map 35 of FIG. 5. Relationships can be determined between the occupancy pattern of the charging station and the particular path or route traveled by the EV to reach the charging station. The most similar pattern corresponding to the requesting EV's path is provided as forecasting information.

The state of charge of the EVs can be included in the probe data. The probabilities of the EVs using the charging station based on the state of charge of the EVs is determined. Thus, the charging demands for the charging station are estimated based on the received states of charge, i.e., remaining battery life of the EVs. The state of charge levels for EVs are determined at a specific time period, e.g., the present, for EVs proximal the charging station and the occupancy trend is determined and provided to the requesting EV as forecasting information.

The destination settings for the EVs can be included in the probe data, as shown in the map 35 of FIG. 5. The probability of charging at the charging station based on the received destinations is determined when the requesting EV sets a destination to that charging station. The destinations are then determined for a specific time period, e.g., the present, for EVs around the charging station and the occupancy trend is determined and provided to the requesting EV as forecasting information.

The probe data can include charging status of the EVs or of a particular charging station, such as when charging is occurring. Estimated vacant or availability time for the charging station can be predicted and provided to the requesting EV.

Additionally, the aforementioned factors can be combined in any desirable combination when determining an occupancy trend for a particular charging station. The resulting occupancy trend is then provided to the requesting EV to facilitate adequately planning a route in view of the current and/or predicated availability of charging stations along or proximal the route.

Figure 6:
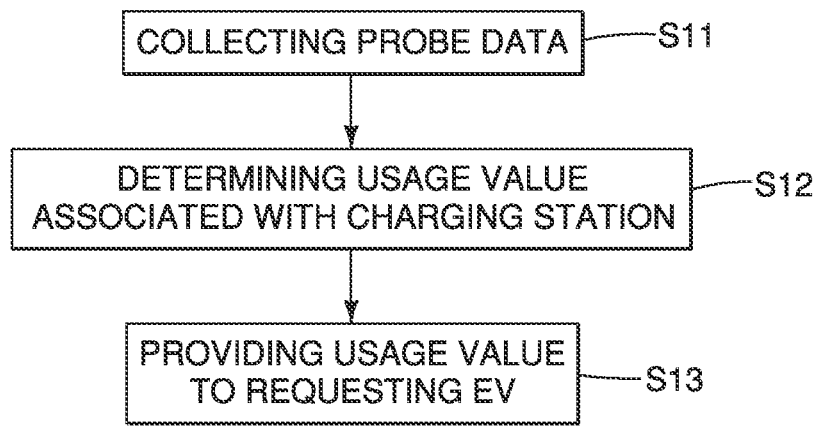
FIG. 6 is a flowchart illustrating providing a usage value associated with a charging station.

In accordance with an exemplary embodiment of the present invention, as shown in FIG. 6, a method of monitoring usage of a charging station includes a step S11 of collecting probe data from a plurality of electric vehicles (8, 9 and 10 of FIG. 3). The probe data includes charging activity history for the plurality of electric vehicles. In step S12, a usage value associated with a charging station is determined based on the collected probe data. In step S13, the usage value associated with the charging station is provided to a requesting electric vehicle (11 of FIG. 4). As shown in FIG. 3, the usage value of the charging station can be displayed within the requesting EV 11. For example, the usage value of a charging station 27 can be displayed on a map showing the location of the charging station. Usage values associated with a plurality of charging stations can be determined and provided to the requesting electric vehicle 11. As shown in FIG. 3, the plurality of usage values associated with the charging stations can be displayed within the electric vehicle. For example, the usage values of charging stations 27, 28 and 29 can be displayed on a map showing the locations of the plurality of charging stations. The usage value is sent from a server connected to the transmitting unit 20 directly to a telematics unit, such as the communications unit 15, of the requesting electric vehicle 11.

The probe data sent by the plurality of EVs in step S11 can include a location of the charging station and start and end timestamps of charging activity at the charging station. The data center 16 can predict a vacant, or available, time of the charging station based on the received start and end timestamps.

The probe data can also include a charging indicator when one of the plurality of electric vehicles is presently charging at the charging station. The data center 16 can provide the requesting EV 11 with an estimated vacant, or available, time of the charging station based on the charging status of the presently charging vehicle.

The probe data can include a current location and a state of charge, i.e., remaining battery life, of the requesting EV 11. When the current location of the EV is proximal a charging station and the state of charge of the EV is not increasing (i.e., the EV is not being charged), the usage value of the proximal charging station indicates a waiting time for use of the charging station.

The usage value provided in step S13 can be provided as an average waiting time for the charging station or as a waiting probability (i.e., likelihood that the charging station is in use). The usage value can be converted into an indication of congestion associated with the charging station 27, as shown in FIG. 3. The indication of congestion can be color coded. The indications can be "vacant" to indicate no waiting time, "rarely occupied" to indicate under approximately 10% vacant, "slightly congested" to indicate under approximately 30% vacant, "relatively crowded" to indicate between approximately 30 to approximately 60% vacant, and "crowded" to indicate over approximately 60% crowded.

Figure 7:
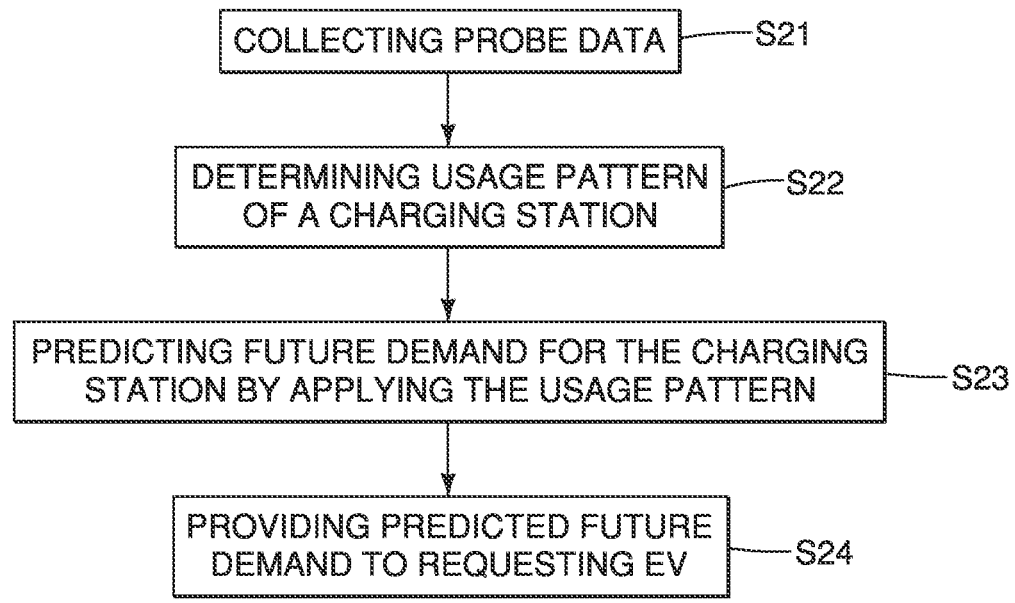
FIG. 7 is a flowchart illustrating predicting a future demand for a charging station.

In accordance with another exemplary embodiment of the present invention, as shown in FIG. 7, a method of predicting future demand of a charging station includes a step S21 of collecting probe data from a plurality of electric vehicles 8, 9 and 10 (FIG. 3). The probe data includes charging activity history of the plurality of electric vehicles 8, 9 and 10. In step S22, a usage pattern of a charging station 33 (FIG. 5) is determined based on the probe data for the charging station. In step S23, a future demand for the charging station is predicted by applying the usage pattern to a factor associated with a requesting electric vehicle 11 (FIG. 2). The predicted future demand for the charging station 33 is provided to the requesting electric vehicle 11 in step S24.

The usage patterns determined in step S22 can be created based on occupancy, waiting time or queuing volume at the charging station 33, as shown in FIG. 5. The usage pattern can be based on the charging station 33, on a particular time, on a specified period of time, on a day of the week, on a particular day of the year, on a particular season of the year, or any other desired factor.

The probe data sent by the plurality of EVs in step S21 can include a location of the charging station and start and end timestamps of charging activity at the charging station.

Predicting the future demand in step S23 can include applying a plurality of usage patterns determined in step S22 based on at least two different types of probe data. For example, the probe data on which the usage patterns are determined can include a location of the charging station, a day of the week and a time period, or any other desirable factor.

The probe data sent in step S21 can include the current locations of the plurality of electric vehicles 8, 9 and 10. In step S22, determining the usage pattern can include determining relationships between the plurality of electric vehicles and the charging station 33 (FIG. 5) based on the current locations of the plurality of electric vehicles 43, 44 and 45. A trend model of future usage is generated, as illustrated in maps 52-54 of FIG. 5, based on a distance of the requesting electric vehicle from the charging station. A similar EV distribution situation is determined from the trend model and a corresponding occupancy trend is provided to the requesting EV 11.

The probe data sent in step S21 can include information regarding arrival and departure of the plurality of electric vehicles at the charging station 33 (FIG. 5). In step S22, predicting the usage pattern includes determining a relationship between an occupancy pattern of the charging station and a distribution of the plurality of electric vehicles. A similar usage pattern can be determined based on the requesting EV's direction of travel and providing a corresponding occupancy trend to the requesting EV 11.

The probe data send in step S21 can include a state of charge of the plurality of EVs. The usage pattern determined in step S22 includes predicting charging activity based on the current state of charge received from the plurality of EVs. An occupancy trend at the charging station can then be predicted based on the EVs proximal to the charging station.

The probe data sent in step S21 includes destination settings for the plurality of electric vehicles, as shown in FIG. 5. A probability of charging activity occurring at the charging station 33 can be determined based on the received destination settings when the requesting EV 11 sets a destination. The destination settings can be associated with a specific time period and an occupancy trend based on the destination settings for that specific time period can be provided to the requesting EV 11.

Additionally, a similar pattern for departures of the plurality of EVs 8, 9 and 10 can be determined. A corresponding occupancy trend based on the departure pattern is sent to the requesting EV 11. To facilitate determining the departure patterns, the probe data sent in step S21 includes a direction of travel of the plurality of electric vehicles. A relationship between the occupancy pattern of the charging station 33 (FIG. 5) and the direction of travel of the plurality of EVs can be determined.

Figure 8:
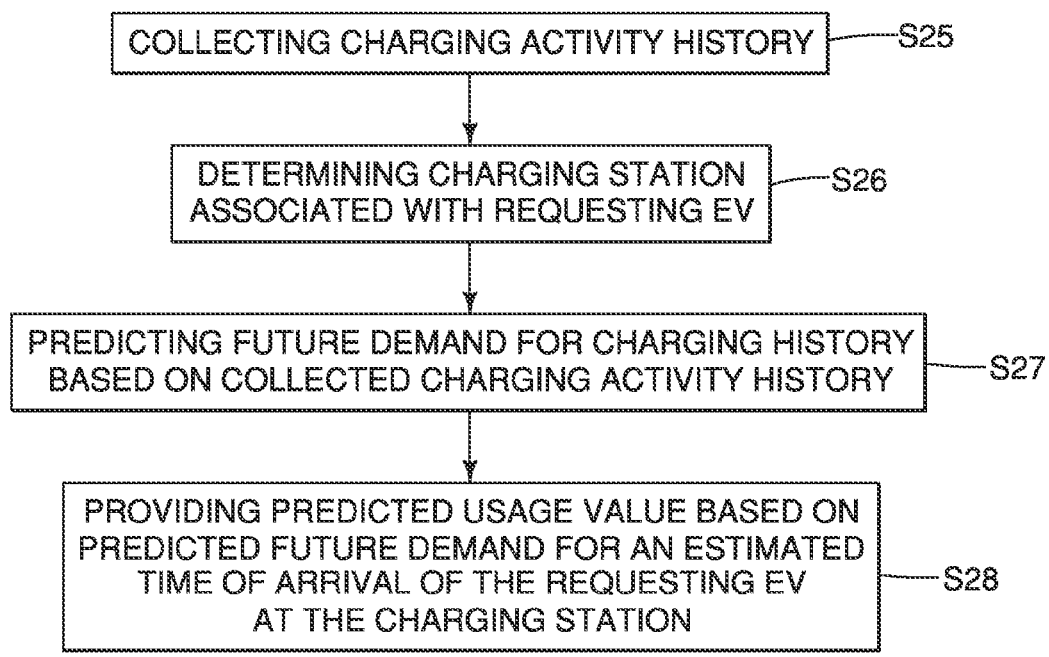
FIG. 8 is a flowchart illustrating providing a predicted usage value based on a predicted future demand for an estimated arrival time at a charging station.

In accordance with another exemplary embodiment of the present invention, as shown in FIG. 8, a method of predicting usage of a charging station includes a step S31 in which charging activity history of a plurality of charging stations is collected. A charging station associated with a requesting EV is determined in step S32. A future demand for the charging station based on the collected charging activity history is predicted in step S33. A predicted usage value of the charging station is provided in step S34 based on the predicted future demand (step S33) for an estimated time of arrival of the requesting electric vehicle at the charging station.

In step S32, when determining the charging station associated with the requesting EV 11 (FIG. 2), the charging station can be along the route of travel, proximal to a location of the requesting EV or proximal to the route of travel, as shown in FIGS. 2 and 3.

The charging activity history collected in step S31 can include a location and charging start and end timestamps of the plurality of charging stations. The charging activity history can be the probe data received from the plurality of EVs.

In step S33, the future demand can be predicted for a plurality of charging stations. In step S34, the predicted usage value can be provided for a plurality of charging stations.

A route to a most appropriate charging station can be provided to the requesting EV 11 based on the predicted usage value of step S34 and a state of charge of the requesting EV. The predicted usage value can be provided as an average waiting time at the charging station, as a segmented waiting probability based on a percentage of chargers utilized at the charging station, as an indication of congestion at the charging station, or any other suitable representative factor of interest. The indication of congestion can be color coded such that the charging station is represented with a color indicating the level of congestion. The indications can be "vacant" to indicate no waiting time, "rarely occupied" to indicate under approximately 10% vacant, "slightly congested" to indicate under approximately 30% vacant, "relatively crowded" to indicate between approximately 30 to approximately 60% vacant, and "crowded" to indicate over approximately 60% crowded. The predicted usage value of step S34 is displayed within the requesting EV 11, such as on a map showing the location of the charging station as shown in FIG. 3.

The usage value predicted in step S34 is determined for a plurality of charging stations. The predicted usage values for the plurality of charging stations is provided to the requesting EV. The plurality of predicted usage values are displayed within the requesting EV, such as on a map showing the locations of the plurality of charging stations as shown in FIG. 3.

The usage value can be sent from a server connected to the transmitting unit 20 of the data center 16 directly to a telematics unit, such as the communications unit 15, of the requesting electric vehicle 11.

In step S33, predicting future demand can include determining a pattern of charging activity of one of the plurality of charging stations and applying the determined pattern to the requesting electric vehicle, as shown in the maps 52-54 of FIG. 5. The patterns can be based on a time period, such as a predetermined time duration (e.g., 10 am-12 pm or morning), on a day of the week, on a day of the year, on a season of the year, or any other suitable factor.

The units associated with the EV 11 and the data center 16 disclosed herein preferably include a microcomputer with a control program that controls the associated functions. The units can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the units can be any combination of hardware and software that will carry out the functions of the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward". "vertical", "horizontal", "below" and "transverse" as well as any other similar directional terms refer to those directions of a vehicle.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method of predicting future demand of a charging station, comprising the steps of:
   collecting probe data from a plurality of electric vehicles, the probe data including charging activity history of the plurality of electric vehicles;
   determining a usage pattern of a charging station based on the charging activity history of the plurality of electric vehicles included in the collected probe data for the charging station;
   predicting a future charging demand for the charging station by applying the usage pattern to a factor associated with a requesting electric vehicle; and
   providing the predicted future charging demand for the charging station to the requesting electric vehicle.

2. The method of predicting future demand of a charging station according to claim 1, wherein
   the determining the usage pattern step includes creating patterns based on occupancy, waiting time or a volume of waiting electric vehicles at the charging station.

3. The method of predicting future demand of a charging station according to claim 2, wherein
   the usage pattern is based on the charging station.

4. The method of predicting future demand of a charging station according to claim 2, wherein
   the usage pattern is based on time.

5. The method of predicting future demand of a charging station according to claim 4, wherein
   the usage pattern is based on a specified period of time.

6. The method of predicting future demand of a charging station according to claim 2, wherein
   the usage pattern is based on a day of the week.

7. The method of predicting future demand of a charging station according to claim 2, wherein
   the usage pattern is based on a particular day of the year.

8. The method of predicting future demand of a charging station according to claim 2, wherein
   the usage pattern is based on a season of the year.

9. The method of predicting future demand of a charging station according to claim 1, wherein
   the probe data includes start and end timestamps of charging activity at the charging station.

10. The method of predicting future demand of a charging station according to claim 1, wherein
    the predicting future charging demand step includes applying a plurality of usage patterns based on at least two different types of probe data.

11. The method of predicting future demand of a charging station according to claim 10, wherein
    the at least two different types of probe data include a location of the charging station, a day of the week and a time period.

12. The method of predicting future demand of a charging station according to claim 1, wherein
    the probe data includes locations of the plurality of electric vehicles.

13. The method of predicting future demand of a charging station according to claim 12, wherein
    the determining the usage pattern step includes determining relationships between the plurality of electric vehicles and the charging station based on the locations of the plurality of electric vehicles; and
    making a trend model of future usage based on a distance of the requesting electric vehicle from the charging station.

14. The method of predicting future demand of a charging station according to claim 13, further comprising
    determining a similar electric vehicle distribution situation from the trend model; and
    providing a corresponding occupancy trend to the requesting electric vehicle.

15. The method of predicting future demand of a charging station according to claim 1, wherein
    the probe data includes information regarding arrival and departure of the plurality of electric vehicles at the charging station.

16. The method of predicting future demand of a charging station according to claim 15, wherein
    the predicting the usage pattern step includes determining relationships between an occupancy pattern of the charging station and a distribution of the plurality of electric vehicles.

17. The method of predicting future demand of a charging station according to claim 1, wherein
    determining a similar pattern for departures of the plurality of electric vehicles; and
    providing a corresponding occupancy trend to the requesting electric vehicle.

18. The method of predicting future demand of a charging station according to claim 17, wherein
    the probe data includes a direction of travel of the plurality of electric vehicles.

19. The method of predicting future demand of a charging station according to claim 13, wherein
    the probe data includes a state of charge of the plurality of electric vehicles; and
    the determining the usage pattern step includes predicting charging activity based on the state of charge.

20. The method of predicting future demand of a charging station according to claim 19, further comprising
    predicting an occupancy trend at the charging station based on the electric vehicles proximal the charging station.

21. The method of predicting future demand of a charging station according to claim 1, wherein
    the probe data includes destination settings for the plurality of electric vehicles; and
    determining a probability of charging activity occurring at the charging station based on the destination settings when the requesting electric vehicle sets a destination.

22. The method of predicting future demand of a charging station according to claim 21, further comprising
    the probe data includes destination settings for a specific time period; and
    providing an occupancy trend based on the destination settings to the requesting electric vehicle.

23. A system of predicting future demand of a charging station, comprising:
    a data center including
      a data collector configured to collect probe data from a plurality of electric vehicles, the probe data including charging activity history of the plurality of electric vehicles;
      a determination unit configured to determine a usage pattern of a charging station based on the charging activity history of the plurality of electric vehicles included in the collected probe data for the charging station and to predict a future charging demand for the charging station by applying the usage pattern to a factor associated with a requesting electric vehicle; and a transmitting unit configured to transmit the predicted future charging demand; and a requesting electric vehicle including a communication unit configured to receive the predicted future charging demand for the charging station from the transmitting unit; and a display configured to display the predicted future charging demand.

24. The system of predicting future demand of a charging station according to claim 23, wherein the charging station includes at least one charger.

25. A method of predicting future demand of a charging station, comprising the steps of:

collecting probe data from a plurality of electric vehicles, the probe data including charging activity history of the plurality of electric vehicles and a direction of travel of the plurality of electric vehicles;

determining a usage pattern of a charging station based on the collected probe data for the charging station;

determining a similar pattern for departures of the plurality of electric vehicles based on the collected probe data for the charging station;

determining a relationship between an occupancy pattern of the charging station and the direction of travel of the plurality of electric vehicles predicting a future charging demand for the charging station by applying the usage pattern to a factor associated with a requesting electric vehicle;

providing the predicted future charging demand for the charging station to the requesting electric vehicle; and providing a corresponding occupancy trend to the requesting electric vehicle.

26. The method of predicting future demand of a charging station according to claim 25, wherein determining a similar usage pattern based on the requesting electric vehicles direction of travel; and providing a corresponding occupancy trend to the requesting electric vehicle.

* * * * *